(12) United States Patent
Liu et al.

(10) Patent No.: US 11,791,898 B2
(45) Date of Patent: Oct. 17, 2023

(54) METHOD, DEVICE AND COMPUTER-READABLE STORAGE MEDIUM IMPLEMENTED IN OPTICAL NETWORK

(71) Applicant: NOKIA SOLUTIONS AND NETWORKS OY, Espoo (FI)

(72) Inventors: Yi Liu, Qingdao (CN); Shugao Song, Qingdao (CN); Xin Zhang, Qingdao (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/798,642

(22) Filed: Feb. 24, 2020

(65) Prior Publication Data

US 2020/0274618 A1  Aug. 27, 2020

(30) Foreign Application Priority Data

Feb. 22, 2019  (CN) .......................... 201910133786.7

(51) Int. Cl.
*H04J 14/00* (2006.01)
*H04B 10/27* (2013.01)

(52) U.S. Cl.
CPC .................................. *H04B 10/27* (2013.01)

(58) Field of Classification Search
CPC .................................................... H04B 10/27
See application file for complete search history.

(56) References Cited

U.S. PATENT DOCUMENTS

| 2011/0262129 A1* | 10/2011 | Shaffer | H04W 12/06 |
| | | | 398/5 |
| 2016/0204864 A1* | 7/2016 | Linney | H04L 12/2869 |
| | | | 398/72 |
| 2016/0248512 A1* | 8/2016 | Yu | H04B 1/0007 |

(Continued)

FOREIGN PATENT DOCUMENTS

| CN | 103210606 A | 7/2013 |
| CN | 106331906 A | 1/2017 |
| CN | 108370272 A | 8/2018 |

OTHER PUBLICATIONS

Broadband Forum, TR-156 Using GPON Access in the context of TR-101, Broadband Form, Issue 3, pp. 1-20 (Year: 2012).*

(Continued)

*Primary Examiner* — Pranesh K Barua
(74) *Attorney, Agent, or Firm* — SQUIRE PATTON BOGGS (US) LLP

(57) ABSTRACT

Embodiments of the present disclosure relate to a method and an optical communication device implemented in an optical network and a computer-readable storage medium. In the method described herein, a distribution point unit (DPU) of the optical network receives a message comprising an identification of a target backhaul model from an Optical Line Terminal (OLT) in the optical network. The received message is parsed to obtain the identification of the target backhaul model. The target backhaul model indicated by the identification is used to communicate with the OLT. In this way, the DPU is compatible with many types of backhaul models and is capable of flexibly switching between the many types of backhaul models.

11 Claims, 6 Drawing Sheets

(56) References Cited

U.S. PATENT DOCUMENTS

2017/0272311 A1 9/2017 Kerpez et al.
2020/0244309 A1* 7/2020 Kuipers .................. H04B 3/32

OTHER PUBLICATIONS

Broadband Forum, TR-301 Architecture and Requirements for Fiber to the Distribution Point, Broadband Form, Issue 2, All pages (Year: 2017).*
Broadband Forum, TR-156 Using GPON Access in the context of TR-101, Broadband Form, Issue 3, All pages (Year: 2012).*
Chinese Office Action corresponding to CN Application No. 201910133786.7, dated Sep. 30, 2021.
Chinese Office Action corresponding to CN Application No. 201910133786.7, dated May 6, 2022.

* cited by examiner

METHOD, DEVICE AND COMPUTER-READABLE STORAGE MEDIUM IMPLEMENTED IN OPTICAL NETWORK

FIELD

Embodiments of the present disclosure generally relate to communication technology, and more specifically to a method, a device and a computer-readable storage medium implemented in an optical network.

BACKGROUND

A network architecture that supports near term residential deployments is described in a broadband forum (BBF) technical report (TR) 101 (also referred to as TR-101), and an evolutionary-type multi-service EDGE network architecture for supporting residential, business and large-scale deployments is described in TR-178. Based on this, TR-301 provides a new node type, namely, a distributed point unit (DPU), which is applied in the framework of both TR-101 and TR-178. The DPU is a node that generally exists at the distribution point (DP) in the FTTx (fiber-to-x) architecture and is connected to an upstream node HON in an optical line terminal (OLT). The HON provides access functions that are not supported by DPU itself and an aggregation function for the DPU. Generally, the DPU and HON are managed by a persistent management agent (PMA) in the optical network.

In an evolution process from a conventional fixed access network to an optical network, especially to a software design network (SDN), there are two types of passive optical network (PON)-based backhaul models that are widely used by suppliers and operators, namely, a TR-156-compatible PON backhaul model and a TR-167-compatible PON backhaul model. In these two backhaul models, the DPU uses a first backhaul model (hereinafter also referred to as backhaul model 1) corresponding to the TR-167-compatible PON backhaul model and a second backhaul model (hereinafter also referred to as backhaul model 2) corresponding to the TR-156-compatible PON backhaul model, respectively.

SUMMARY

In general, embodiments of the present disclosure provide a method, a device and a computer-readable storage medium implemented in an optical network.

In a first aspect, embodiments of the present disclosure provide a device for communication in an optical network. The device comprises: at least one processor and at least one memory. The at least one memory comprises computer program codes. The at least one memory and the computer program codes are configured, with the at least one processor, to cause the device to: receive a message comprising an identification of a target backhaul model from an Optical Line Terminal (OLT) in an optical network. The device is further caused to parse the received message to obtain the identification of the target backhaul model, and communicate with the OLT using the target backhaul model.

In a second aspect, embodiments of the present disclosure provide a device for communication in an optical network. The device comprises at least one processor and at least one memory. The at least one memory comprises computer program codes. The at least one memory and the computer program codes are configured, with the at least one processor, to cause the device to: select a target backhaul model from a plurality of backhaul models. The device is further caused to transmit, to a Distribution Point Unit (DPU) of the optical network, a message comprising an identification of the target backhaul model, such that the DPU communicates with the device using the target backhaul model.

In a third aspect, embodiments of the present disclosure provide a method implemented in an optical network. The method comprises receiving, by a Distribution Point Unit (DPU) of an optical network, a message comprising an identification of a target backhaul model from an Optical Line Terminal (OLT) in the optical network. The method further comprises parsing the received message to obtain the identification of the target backhaul model, and communicating with the OLT using the target backhaul model.

In a fourth aspect, embodiments of the present disclosure provide a method implemented in an optical network. The method comprises selecting, by an Optical Line Terminal (OLT) in the optical network, a target backhaul model from a plurality of backhaul models. The method further comprises transmitting, to a Distribution Point Unit (DPU) of the optical network, a message comprising an identification of the target backhaul model, such that the DPU communicates with the OLT using the target backhaul model.

In a fifth aspect, embodiments of the present disclosure provide an apparatus for communication in an optical network. The apparatus comprises means for executing the method according to the third aspect.

In a sixth aspect, embodiments of the present disclosure provide an apparatus for communication in an optical network. The apparatus comprises means for executing the method according to the fourth aspect.

In a seventh aspect, embodiments of the present disclosure provide a computer-readable storage medium with a computer program stored thereon. The computer program comprises instructions which, when implemented by a processor on a device, cause the device to execute the method according to the third aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the figures, wherein.

In the figures, the same or similar reference numerals indicate the same or similar elements.

DETAILED DESCRIPTION OF EMBODIMENTS

Figure 1:
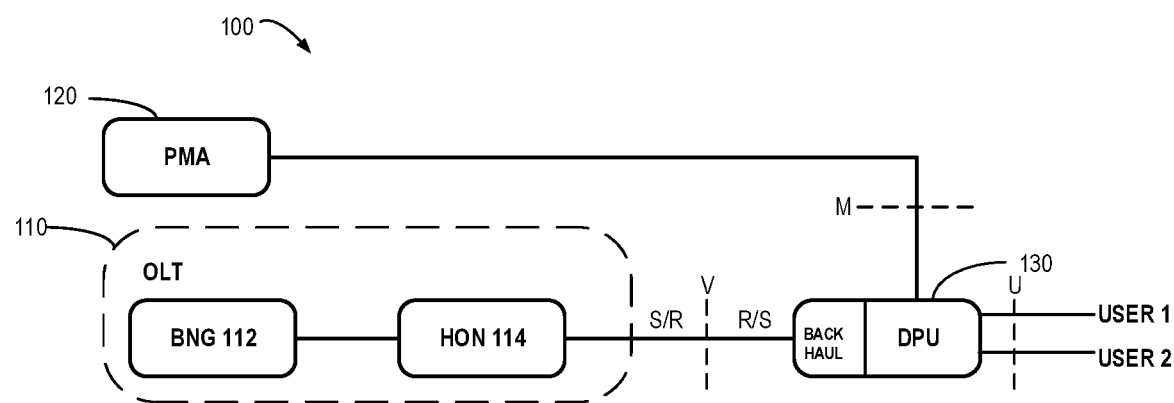
FIG. 1 illustrates a schematic diagram of a backhaul deployment in an optical communication network.

Preferred embodiments of the present disclosure will be described below in more detail with reference to figures. Although figures show preferred embodiments of the present disclosure, it should be appreciated that the present disclosure may be implemented in various forms and should not be limited by embodiments stated herein. On the contrary, these embodiments are provided to make the present disclosure more apparent and complete, and to convey the scope of the present disclosure entirely to those skilled in the art.

As used herein, the term "includes" and its variants are to be read as open terms that mean "includes, but is not limited to." Unless otherwise specified, the term "or" represents "and/or". The term "based on" is to be read as "based at least in part on." The terms "example embodiment" and "some embodiments" are to be read as "at least one example embodiment". Other explicit or implicit definitions might be also included in the text below.

The term "circuitry" as used herein refers to one or more of the following:

(a) hardware-only circuit implementations (such as implementations only in analog and/or digital circuitry); and (b) combinations of hardware circuits and software, such as (if applicable): i) a combination of analog and/or digital hardware circuits and software/firmware, and (ii) any portion of a hardware processor and software (including digital signal processors, software, and memories that work together to enable devices such as OLTs, DPUs or other computing devices to perform various functions); and (c) hardware circuits and/or processors, such as microprocessors or a portion of a microprocessor), that require software (e.g., firmware) for operation, but there may not be software when software is not required for operation.

This definition of circuitry applies to all uses of this term in this text, including in any claim. As a further example, as used in this text, the term "circuitry" also covers an implementation of merely a hardware circuit or a processor (or multiple processors), a portion of a hardware circuit or a processor or its accompanying software or firmware implementation. For example, the term "circuitry" also covers a baseband integrated circuit or a processor integrated circuit or a similar integrated circuit in an OLT, a DPU or other computing devices.

The terms "optical network", "optical communication network", "passive optical network", and "PON" used herein refer to that the optical distribution network (ODN) included therein includes passive devices such as optical splitters and optical fibers, without requiring any active device, and they include but are not limited to Gigabit-Capable Passive Optical Networks (GPON), 10-Gigabit-Capable Passive Optical Network (XG-PON), 10-Gigabit-Capable Symmetric Passive Optical Network (XGS-PON), Next-Generation Passive Optical Networks (NG-PON), and other optical communication networks currently known or to be developed in the future.

The terms "optical line terminal" or "OLT" used herein refer to a terminal device that serves as a multi-service provisioning platform in an optical network and has a function of real-time monitoring, management, and maintenance of the DPU.

The terms "persistent management agent" or "PMA" used herein refer to a management agent that provides a management function to the DPU and caches the configuration and last known status information for the DPU. PMA may reside at any position in the network.

The term "distribution point unit" or "DPU" used herein refers to a physical node which typically resides at a distribution point (DP) in a fiber-to-distribution point (FTTdp) architecture, and it utilizes a gigabit or an even faster optical fiber link to send user data back to a higher order node (HON) in an OLT.

In the network deployment, the DPU using the backhaul model 1 and the DPU using the backhaul model 2 use different independent devices, and the respective management functions for which the PMA and HON corresponding to the two backhaul models are responsible are different. Hence, during the evolution to SDN, operators may not only need to replace a DPU using one backhaul model with a DPU using another backhaul model, but also need to change the configuration of PMA and HON at the same time. From the perspective of supplier deployment and maintenance, in order to meet the operators' different deployment requirements for the two backhaul models, the suppliers must also develop and maintain two different physical DPU devices, as well as hardware and software corresponding to the DPU devices. Therefore, for suppliers and operators, switching between the two backhaul models will increase the burden of development, maintenance and management.

FIG. 1 shows a schematic diagram of a backhaul deployment in an optical communication network 100. It should be understood that the deployment structure shown in FIG. 1 is for example purposes only and does not imply any limitation on the scope of the present disclosure. Embodiments of the present disclosure may be embodied in different deployment structures.

As shown in FIG. 1, the optical network 100 may include a standard or any currently-known or to-be-developed optical communication network such as GPON, XG-PON, XGS-PON or NG-PON. The optical network 100 includes an OLT 110, a PMA 120 and a DPU 130. The OLT 110 at least includes a broadband network gateway (BNG) 112 and a HON 114, and the HON 114 is communicatively connected with the DPU 130. Although only a very limited number of OLT 110, PMA 120 and DPU 130 are shown in FIG. 1, the numbers are exemplary rather than limiting. In practice, there may be more OLTs, PMAs and DPUs as needed.

As described above, in current optical network deployments, the TR-167 PON backhaul model and the TR-156 PON backhaul model are commonly used. These two backhaul models correspond to the DPUs using backhaul model 1 and the DPU using backhaul model 2, respectively. The management functions for which OLT and PMA are responsible are different due to the specific backhaul models employed by the optical communication network.

When the DPU employing the backhaul model 1 is used, the HON performs the function of an aggregation node as defined in TR-101 and TR-178. TR-167 backhaul directly accesses to a physical user port, and the traffic for all user ports in the DPU shares a common interface to the backhaul, and per user port tagging functions are performed by the DPU. The PMA 120 is responsible for the management of the following functions:

Tag addition, conversion and removal at user ports
Upstream and downstream priority queue configuration
Upstream and downstream frame to priority queue mapping
All copper drop transceiver provisioning and monitoring (which employs G.fast and VDSL2 technologies)
User port state including reverse power feeding (RPF)

Multicast whitelist
Equipment command and control including software image download and restart
Provisioning of intermediate and relay agents
Circuit ID When the DPU employing the backhaul model 1 is used, unlike direct access to a physical user port, TR-156 backhaul uses a virtual Ethernet interface for each DPU user port. Frames are forwarded unchanged between the physical user port and the virtual Ethernet interface and are carried to the HON by GEM ports. The PMA is responsible for the management of the following functions:

All copper drop transceiver provisioning and monitoring (which employs G.fast and VDSL2 technologies)
User port state including RPF Currently, a single DPU 130 device can only support operating in one of the backhaul model 1 and backhaul model 2. If operators desire to change from a DPU 130 supporting the backhaul model 1 to a DPU 130 supporting the backhaul model 2, they need to manually remove the DPU 130 device supporting the backhaul model 1, and then replace it with the DPU 130 device supporting the backhaul model 2, and vice versa. In addition, because respective management functions of the PMAs 120 and HONs 114 corresponding to the DPUs 130 supporting these two backhaul models are different, when the network changes, the PMA 120 and HON 114 also need to be changed and configured accordingly. It should be understood that these deployment processes are labor intensive and cumbersome. From the perspective of development and management of suppliers, DPU suppliers must develop and maintain two different physical DPU devices, including the respective two types of hardware and software. This brings a lot of difficulty to the deployment, management, development and maintenance of nodes in the optical network, and increases the costs of operators and suppliers.

According to embodiments of the present disclosure, architecture compatible with multiple backhaul models and capable of flexibly switching between multiple backhaul models is proposed. In short, the architecture supports a "zero touched" deployment for the DPU because all backhaul models may be implemented on the same DPU device. In other words, when an operator or a supplier wants to switch networks, it only needs to remotely control the DPU and PMA to switch to respective backhaul models through indications, without manually replacing and configuring the DPU and PMA. When the backhaul models are switched, the configuration information of the currently-used backhaul models will be automatically stored by the DPU, so as to quickly restore to the previous configuration of the network when needed. Therefore, the architecture proposed in the embodiments of the present disclosure may achieve a flexible and stable DPU startup and switching process, and significantly reduce the deployment, management and maintenance costs for operators and suppliers.

Figure 2:
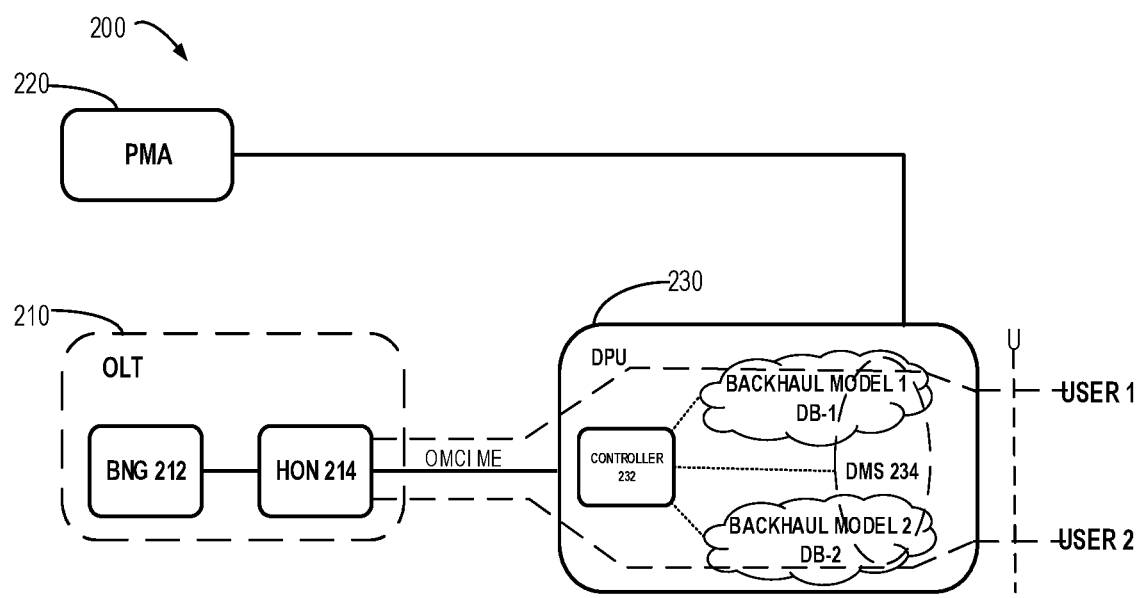
FIG. 2 illustrates an example optical network in which example embodiments of the present disclosure can be implemented.

FIG. 2 illustrates an example optical network 200 in which example embodiments of the present disclosure may be implemented. As shown in FIG. 2, the optical network 200 is similar to the optical network 100 and may include, but is not limited to a standard or any currently-known or to-be-developed optical communication network such as a GPON, a XG-PON, a XGS-PON or a NG-PON. The optical network 200 includes an OLT 210, a PMA 220, and a DPU 230. The OLT 210 includes a BNG 212 and a HON 214. The DPU 230 includes a controller 232 and a data management system (DMS) 234.

The controller 232 may provide the DPU 230 with the functions of receiving, storing, and parsing messages, and the controller 232 may activate or switch the backhaul model used by the DPU 230. The DMS 234 includes a database DB-1 for storing configuration information associated with the backhaul model 1 and a database DB-2 for storing configuration information associated with the backhaul model 2. The DPU 230 communicates with the OLT 210 via an optical network unit control and a management interface (OMCI) channel.

The OLT 210 further includes a management information base MIB (not shown). The standard G.988 recommended by International Telecommunication Union Telecommunication Standardization Sector (ITU-T) defines the OMCI for optical access networks. ITU-T G.988 further specifies managed entities (ME) of a protocol-independent MIB for specifying the exchange of information between the OLT and ONU. In addition, in an optical network, the DPU 230 may actively transmit a remote procedure call (RPC) message to the PMA 220 according to a network configuration (NETCONF) protocol, so as to initiate a call home connection to the PMA 220. NETCONF is a session-based network management protocol that uses XML-encoded RPC and configuration information to manage network devices.

It should be understood that only for the purpose of illustration rather than suggesting any limitations on the scope of the present disclosure, each network element or entity in the network 200 may be physical or virtual, and may be implemented in any appropriate manner. The number of network elements or entities shown is merely exemplary rather than suggesting any limitation on the scope of the present disclosure. Moreover, elements or entities may communicate using any communication technology currently known and to be developed in the future.

Figure 3:
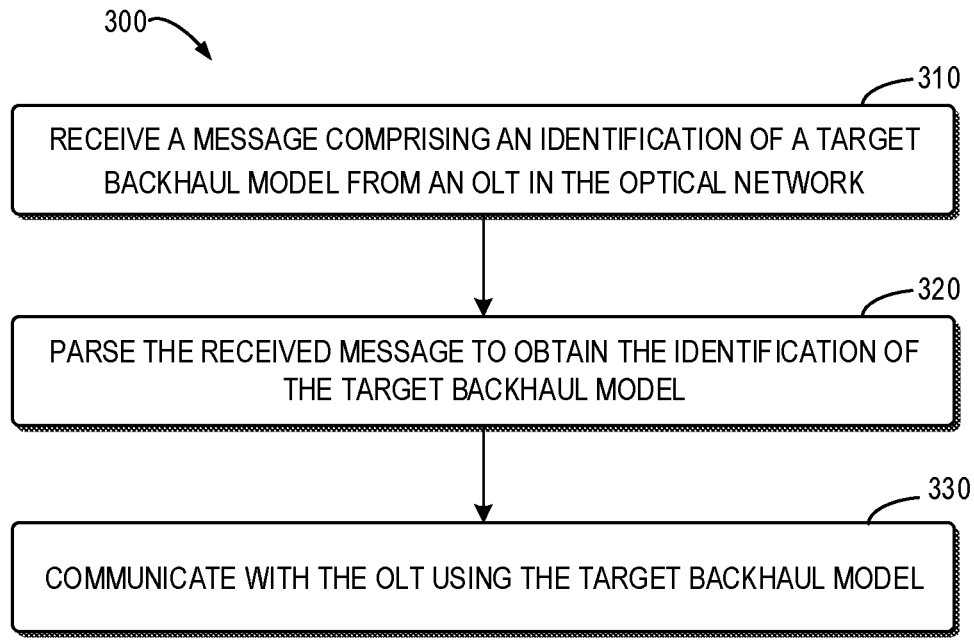
FIG. 3 illustrates a flowchart of a method according to some embodiments of the present disclosure.

FIG. 3 illustrates a flowchart of a method 300 according to some embodiments of the present disclosure. The method 300 may be implemented at a DPU in an optical network, for example, may be implemented at the DPU 230 shown in FIG. 2, or may be implemented with any suitable device. For the purpose of discussion, the method 300 will be described below with reference to FIG. 2.

As shown in FIG. 3, at block 310, the DPU 230 receives, from an OLT 110, a message comprising an identification of a target backhaul model. For example, after the DPU 230 is registered in the optical communication network 200, the OLT 110 may transmit a message, such as OMCI ME, comprising the identification of the target backhaul model, to the DPU 230.

OMCI ME is defined to express the target backhaul model. As an example, one byte in OMCI ME may be used to represent the identification of the target backhaul model. Tables 1 and 2 below show the identifiers and contents of the OMCI ME for expressing the target backhaul model.

TABLE 1

| OMCI ME identifier format | |
|---|---|
| ME class value | ME name |
| 65280~65535 | PON backhaul model |

TABLE 2

Contents of OMCI ME

| Attributes/ Actions/ Alarms | Size (byte) | Options (read R/write W/not applicable NA) | Stipulations |
|---|---|---|---|
| Attributes | | | |
| ME Instance ID | 2 | R | |
| Identifier of PON backhaul model | 1 | R, W | 1 = Model 1 (TR-167) Enabled 2 = Model 2 (TR-156) Enabled should default to 1 or 2 as needed. |
| Force Data Storage Command | 1 | R, W | This attribute is used to force the DPU to transfer appropriate data from a volatile storage to a non-volatile storage. Whenever a SET command is received (with a value of 1), the DPU performs a storage operation. Storage is still performed when a SET is received, even if the value is already 1. If a SET is received while the data storage operation is in-process, the DPU may either ignore the command, or may interrupt the storage process and start over again. (DPU will initially default this value to 0) |
| Time of Last Data Storage Operation | 4 | R | This attribute represents the time that the DPU finally successfully completed a data storage operation (i.e., in response to a force data storage command). The DPU initially defaults this value to 0, representing that it has never completed a successful data storage operation. NOTE: The DPU must save this attribute during its own resets, reboots, etc. |
| Actions | | | |
| GET | | | DPU gets an attribute value of ME by the "GET" action. |
| SET | | | DPU sets an attribute value of ME by the "SET" action. |
| Handshake AVC Response | | | DPU transmits this in response to the Handshake AVC. |
| Attribute Value Change Notifications | | | |
| Handshake AVC | | | Issues this AVC periodically, and expects OLT to transmit a matching Handshake AVC Response. |
| Other Notifications | | | None defined |

As shown in Table 1, the two most significant bits in the OMCI ME identifier represent a logical ID (i.e., ME class value) allocated by an OMCI, and the two least significant bits represent an ME name for identifying an ME instance. The ME class value is used to distinguish different ME classes, and it may be an integer between 65280 and 65535. Table 2 specifically defines the contents of the OMCI ME. In an optical communication network such as a GPON and a XG-PON, two distributed network elements usually exchange information using OMCI messages. Formats of the OMCI messages may include a baseline OMCI message format and an extended OMCI message format, as shown in Tables 3 and 4 below. In the optical network such as GPON and XG-PON, either the baseline or the extended OMCI message format may be used. Although the baseline OMCI message format is used by default, in implementation, the OLT 210 and the DPU 230 may negotiate to use the extended OMCI message format as needed. In some embodiments, the OLT 210 encapsulates the OMCI ME comprising the identification of the PON backhaul model in an OMCI message and transmits it to the DPU 230. For example, the 5-8 bytes and 9-40 bytes in the baseline OMCI message format may correspond to the OMCI ME identifier shown in Table 1 and the contents of the OMCI ME shown in Table 2, respectively.

TABLE 3

Baseline OMCI message format

| Byte number | Size | Use |
|---|---|---|
| 1-2 | 2 | Transaction correlation identifier |
| 3 | 1 | Message type |
| 4 | 1 | Device identifier |
| 5 . . . 8 | 4 | ME identifier |
| 9 . . . 40 | 32 | Message contents |
| 41 . . . 48 | 8 | OMCI trailer |

TABLE 4

Extended OMCI message format

| Byte number | Size | Use |
|---|---|---|
| 1-2 | 2 | Transaction correlation identifier |
| 3 | 1 | Message type |
| 4 | 1 | Device identifier |
| 5-8 | 4 | ME identifier |
| 9-10 | 2 | Message contents length |
| 11 . . . (N-4) | — | Message contents |
| (N-3) . . . N | 4 | Message integrity check (MIC) |

At block 320, the DPU 230 parses the received message to obtain the identification of the target backhaul model. Based on the parsed identification of the target backhaul model, the DPU 230 may acquire the target backhaul model to be enabled. The identification of the target backhaul model may be, for example, the identification of the PON backhaul model defined in Table 2 above, and it occupies one byte. As an example, if the DPU 230 parses out that the value of the identification of the PON backhaul model included in the OMCI ME is 1, it represents that the target backhaul mode that the OLT 210 indicates the DPU 230 to enable is the backhaul model 1. Similarly, if the DPU 230 parses out that the value of the identification of the PON backhaul model included in the OMCI ME is 2, the OLT 210 indicates that the target backhaul model that the DPU 230 should enable is the backhaul model 2.

Then, at block 330, the DPU 230 communicates with the OLT 210 using the target backhaul model. In some embodiments, the DPU 230 may obtain the configuration information associated with the target backhaul model from the PMA 220 and/or the OLT 210.

In some embodiments, when the DPU 230 obtains the configuration information from the PMA 220, the DPU 230 first transmits an indication of the target backhaul model to the PMA 220 to notify the PMA 220 that the DPU 230 is currently using the target backhaul model. As an example, the DPU 230 may actively transmit an RPC message to the PMA 220 according to a NETCONF protocol to initiate a call home connection to the PMA 220, and transmit the indication of the target backhaul model. Based on the indication of the target backhaul model, the PMA 220 configures the DPU 230 to use the configuration information needed by the target backhaul model and associated with the target backhaul model, and transmits the configuration information to the DPU 230. The DPU 230 then receives from the PMA 220 the configuration information configured by it and associated with the target backhaul model, and configures the target backhaul model based on the configuration information. Then, the DPU 230 communicates with the PMA 220 using the configured target backhaul model. For the purpose of illustration, the following example of RPC is given:

```
<rpc message-id="101" xmlns="urn:ietf:params:xml:ns:netconf:base:1.0">
    <notice-method>
        <!-backhaul model info here... -->
    </notice-method>
</rpc>
```

In some embodiments, when the DPU 230 obtains the configuration information from the OLT 210, the DPU 230 receives, from the OLT 210, the configuration information configured by the OLT 210 and associated with the target backhaul model, and configures the target backhaul model based on the configuration information. Then, the DPU 230 communicates with the OLT 210 using the configured target backhaul model.

Figure 4:
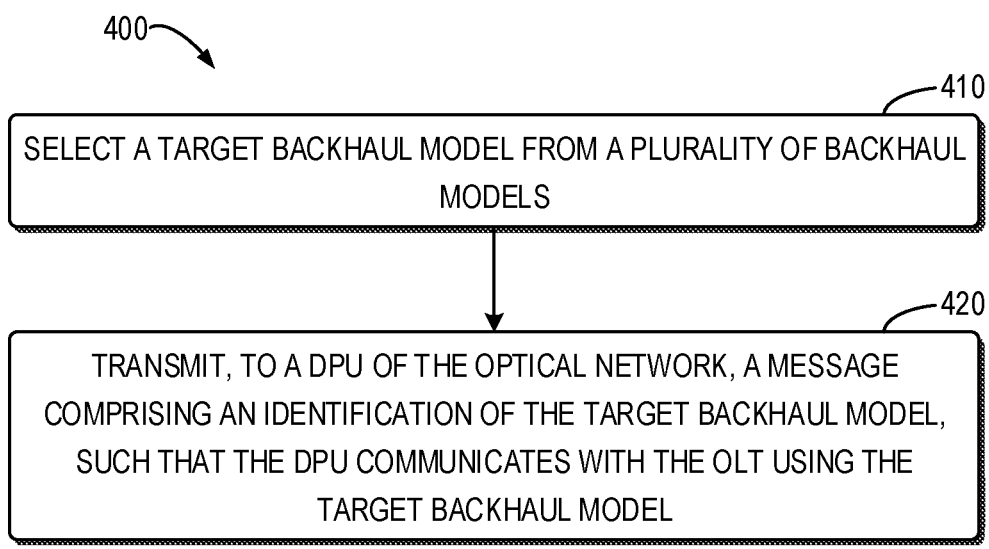
FIG. 4 illustrates a flowchart of a method according to some embodiments of the present disclosure.

FIG. 4 shows a flowchart of a method 400 according to some embodiments of the present disclosure, where the method 400 may be implemented by the OLT 210 shown in FIG. 2 or any suitable device. For the purpose of explanation, the following description will be presented with reference to FIG. 2.

At block 410, the OLT 210 selects a target backhaul model from a plurality of backhaul models. For example, the plurality of backhaul models may at least include a backhaul model 1 corresponding to the TR-167 PON backhaul and a backhaul model 2 corresponding to the TR-156 PON backhaul.

At block 420, the OLT 210 transmits a message comprising the identification of the target backhaul model to the DPU 230, such that the DPU 230 communicates with the OLT 210 using the target backhaul model. For example, as described above, the OLT 210 may transmit the OMCI ME comprising the identification of the target model to the DPU 230.

In some embodiments, the method 400 further includes transmitting to the DPU 230 the configuration information configured by the OLT 210 and associated with the target backhaul model.

In some embodiments, the message comprising the identification of the target backhaul model may indicate that the target backhaul model is to be started in the DPU 230, and may also indicate the DPU 230 to switch from the current backhaul model to the target backhaul model.

Figure 5:
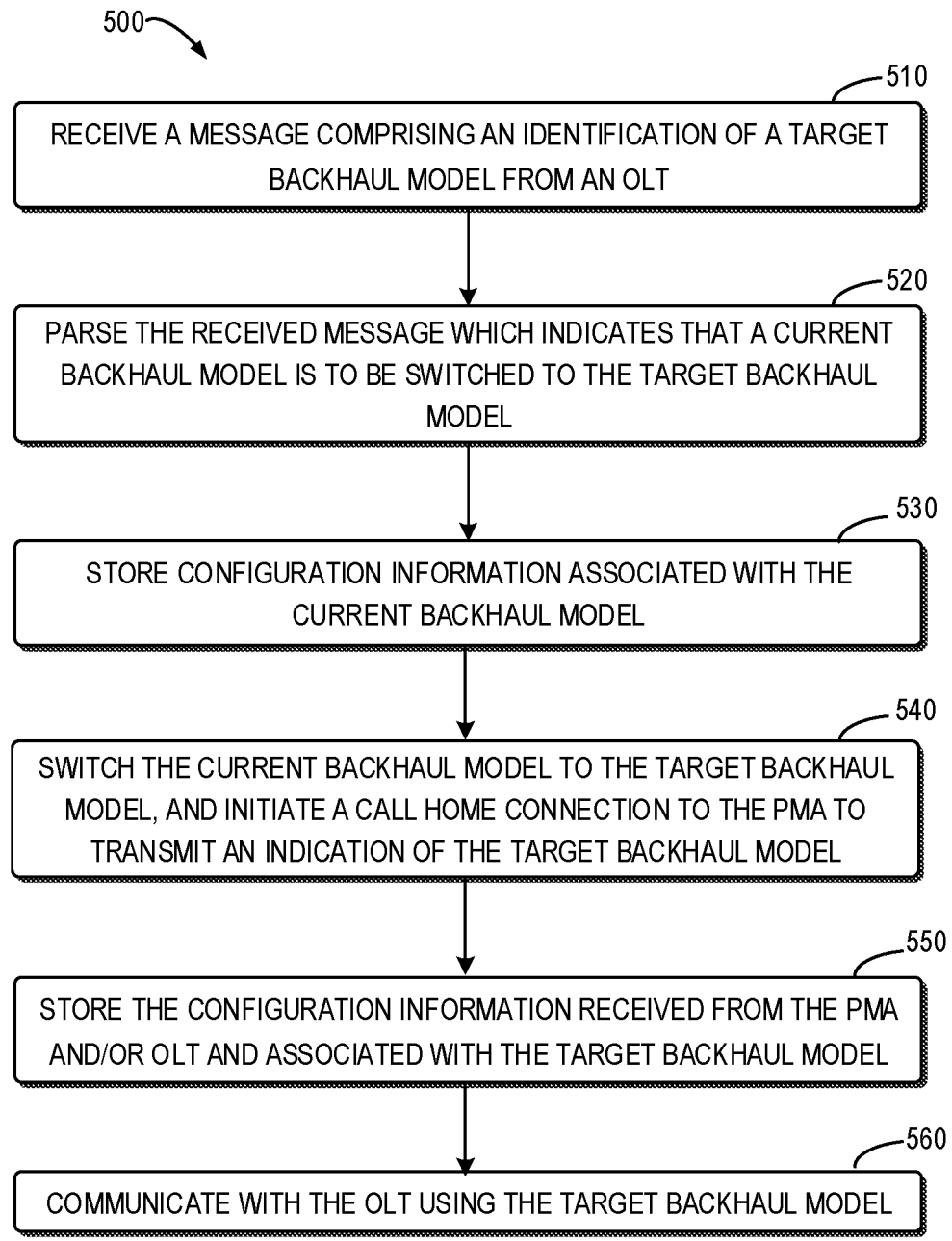
FIG. 5 illustrates a flowchart of a method for switching a target backhaul model in a DPU according to some embodiments of the present disclosure.

FIG. 5 shows a flowchart of a method 500 for switching a target backhaul model in a DPU according to an embodiment of the present disclosure. The OLT 210, PMA 220 and DPU 230 described in FIG. 2 or any appropriate device may be used to perform this process. For the purpose of illustration, the process of switching the target backhaul model in the DPU 230 will be described below with reference to FIG. 2.

At block 510, the DPU 230 operating under the current backhaul model receives a message comprising the identification of the target backhaul model from the OLT 210.

At block 520, the controller 232 of the DPU 230 parses the received message which indicates that the DPU 230 should switch from the current backhaul model to the target backhaul model. As described above, the message may be the OMCI ME sent by the OLT 210 and comprising the identification of the PON backhaul model. As an example, the controller 232 may parse the OMCI ME to determine, based on the value of the identification of the PON backhaul model defined in Table 2, whether to switch from the current backhaul mode to the target backhaul model. If the current backhaul model of the DPU 230 is the backhaul model 2, it corresponds to the TR-156 PON backhaul, and the value of the identification of the PON backhaul model obtained from parsing is 1, then it means that the backhaul model 1 corresponding to the TR-167 PON backhaul should be enabled. In other words, the message indicates that the controller 232 of the DPU 230 should switch from the current backhaul model (i.e., backhaul model 2) to the target backhaul model (i.e., backhaul model 1).

At block 530, the controller 232 of the DPU 230 may store the configuration information associated with the current backhaul model in DB-1 of the DMS 234.

Next, at block 540, the controller 232 of the DPU 230 switches from the current backhaul model to the target backhaul model and initiates a call home connection to the PMA 220 to transmit an indication of the target backhaul model.

At block 550, the DPU 230 stores the configuration information received from the PMA 220 and/or the OLT 210 and associated with the target backhaul model in DB-2 of the DMS 234 that is different from the DB-1.

At block 560, the DPU 230 communicates with the OLT 210 using the configured target backhaul model.

In this embodiment, the message may further include a storage indicator for storing the configuration information associated with the current backhaul model, for example, a force data storage command in the OMCI ME defined in Table 2, the force data storage command occupying one byte in the OMCI ME. As an example, at block 520, when the DPU 230 parses out that the value of the force data storage command included in the message is 1, the step described in block 530 is performed. Although description is presented with reference to FIG. 5, it will be easy to understand that at any time as long as the DPU 230 receives the message from the OLT 210 and parses out that the message includes the storage command, for example, when the value of the force data storage command in the OMCI ME is 1, the DPU 230 may perform the step as described in block 530 to store the configuration information associated with the current backhaul model in a DB of the DMS 234 corresponding to the current backhaul model.

In some example embodiments, the methods 300, 400, and 500 described above with reference to FIGS. 1-5 may be performed by means for performing corresponding steps in the methods 300, 400 and 500. These means may be implemented in any suitable form. For example, the means may be implemented in a circuit or a software module.

Figure 6:
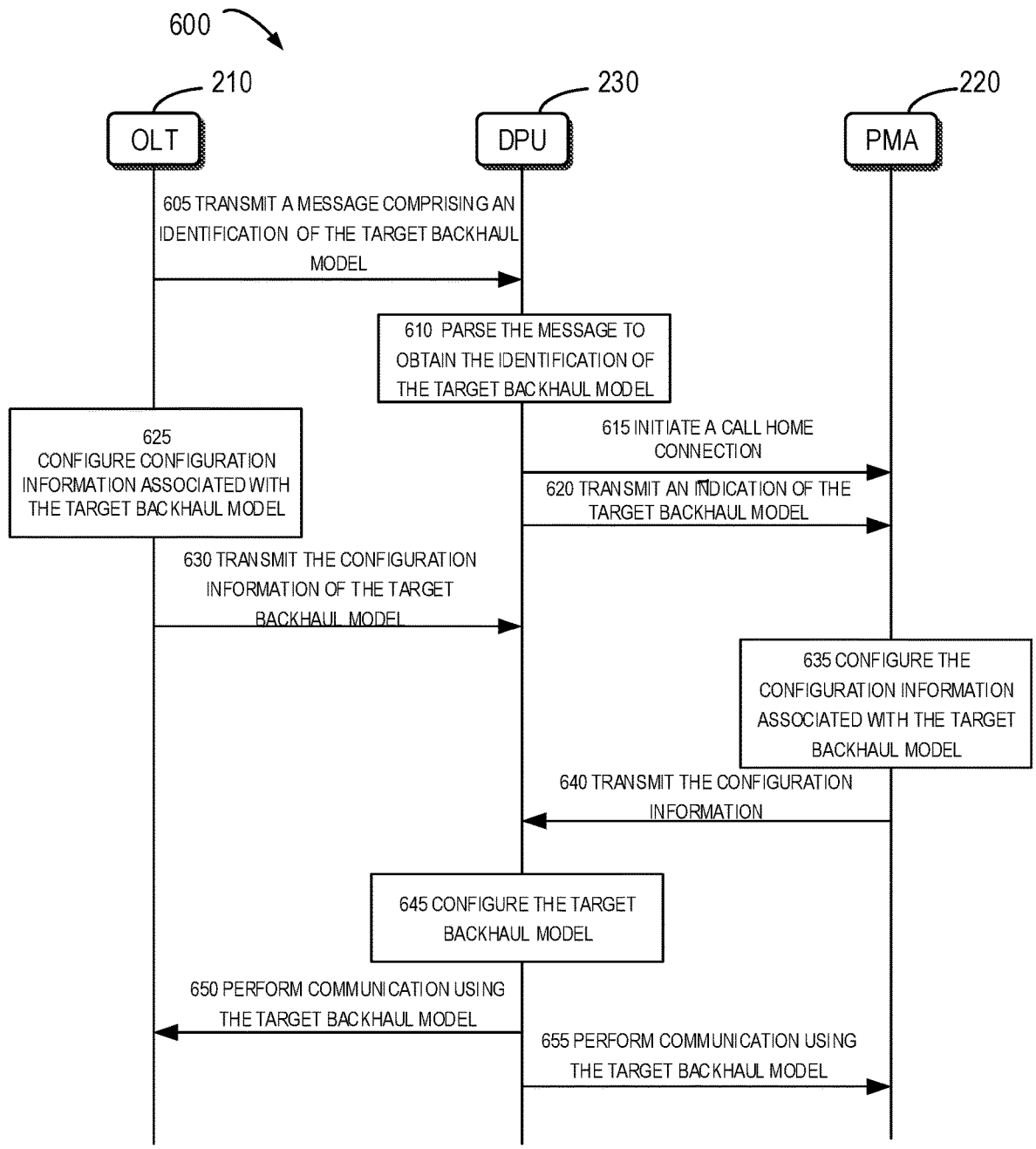
FIG. 6 illustrates a signaling flow of an example interaction process according to some embodiments of the present disclosure.

FIG. 6 illustrates a signaling flow of an example interaction process 600 according to an embodiment of the present disclosure. The interaction process 600 may be implemented in the example optical network 200. As shown in FIG. 6, the OLT 210 transmits (605) a message comprising the identification of the target backhaul model to the DPU 230. The DPU 230 parses (610) the message to obtain the identification of the target backhaul model. Then, the DPU 230 initiates (615) a call home connection to the PMA 220 and transmits (620) an indication of the target backhaul model to the PMA 220. The OLT 210 configures (625) the configuration information associated with the target backhaul model and transmits the configuration information to the DPU 230. Based on the indication of the target backhaul model, the PMA 220 configures (630) the configuration information associated with the target backhaul model and transmits (640) the configuration information to the DPU. The DPU 230 configures (645) the target backhaul model based on the configuration information received from the OLT 210 and/or the PMA 220. Then, the DPU 230 uses the configured target backhaul model to communicate (650, 655) with the OLT 210 and the PMA 220, respectively. Although the steps in the interaction process 600 described above are described in a particular order, this order is for illustrative purposes only and is not limiting. Unless otherwise explicitly specified, it should not be understood that such interactive processes are required to be performed in the shown particular order or in a sequential order. In some cases, multitasking or parallel processing can be beneficial. As an example, one or more operations in the interaction process 600 may be performed in a different order, for example, operation 625 may be performed before, after, or at the same time as operation 615, and so on.

Figure 7:
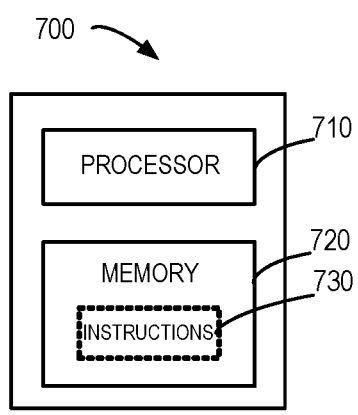
FIG. 7 illustrates a block diagram of a device adapted to implement some embodiments of the present disclosure.

FIG. 7 shows a block diagram of a device 700 adapted to implement embodiments of the present disclosure. The device 700 may be implemented at or at part of the OLT 210 and the DPU 230 shown in FIG. 2.

As shown in FIG. 7, the device 700 includes a processor 710. The processor 710 controls operations and functions of the device 700. For example, in some embodiments, the processor 710 may perform various operations by means of instructions 730 stored in a memory 720 coupled thereto. The memory 720 may be any suitable type applicable for a local technical environment, and may be implemented using any suitable data storage technology, including, but not limited to, semiconductor-based storage devices, magnetic storage devices and systems, optical storage devices and systems. Although only one memory unit is shown in FIG. 7, there may be a plurality of physically different memory units in the device 700.

The processor 710 may be any suitable type applicable for a local technology environment, and may include, but is not limited to one or more of a general-purpose computer, a dedicated computer, a microcontroller, a digital signal controller (DSP), and a controller-based multi-core controller model. The device 700 may also include a plurality of processors 710. The device 700 may implement reception and transmission of information in a wired manner or in a wireless manner by means of an optical fiber or a cable.

The processor 710 causes the device 700 to perform related operations and features of the OLT 210 and the DPU 230 described above with reference to FIGS. 2 to 6 by executing instructions. All the features described above with reference to FIG. 2 to FIG. 6 are applicable to the device 700, and details are not described herein again.

Generally, various embodiments of the present disclosure may be implemented in hardware or special purpose circuits, software, logic or any combination thereof. Some aspects may be implemented in hardware, while other aspects may be implemented in firmware or software which may be executed by a controller, a microprocessor or other computing devices. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

As an example, embodiments of the present disclosure may be described in the context of computer-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage mediums.

Program codes for carrying out methods of the present disclosure may be written in one or more programming languages. These program codes may be provided to a processor of a general purpose computer, a special purpose computer, or other programmable data processing apparatus, such that the program codes, when executed by the computer or other programmable data processing apparatuses, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of the present disclosure, computer program codes or related data may be carried by any suitable carrier to enable a device, an apparatus or a processor to perform the various processes and operations described above. Examples of the carrier include signals, computer-readable mediums, and the like.

Examples of signals may include electrical, optical, radio, sound, or other forms of propagating signals, such as carrier waves, infrared signals, and the like.

In the context of the present disclosure, computer-readable medium may be any tangible medium that includes or stores a program for or about an instruction execution system, an apparatus or a device. The computer-readable medium may be a computer-readable signal medium or a computer-readable storage medium. A computer-readable medium may include but is not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are included in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the present disclosure have been described. In addition to the above content or alternatively, the following embodiments are described. The features described in any of the following examples may be used with any other examples described herein.

Example 1

A device, comprising: at least one processor; and at least one memory comprising computer program codes, the at least one memory and the computer program codes being configured, with the at least one processor, to cause the device to: receive a message comprising an identification of a target backhaul model from an Optical Line Terminal (OLT) in an optical network; parse the received message to obtain the identification of the target backhaul model; and communicate with the OLT using the target backhaul model.

Example 2

The device according to Example 1, wherein the device is further caused to: obtain configuration information associated with the target backhaul model; configure the target backhaul model based on the configuration information; and perform communication using the configured target backhaul model.

Example 3

The device according to Example 2, wherein the device is caused to obtain the configuration information associated with the target backhaul model by obtaining the configuration information associated with the target backhaul model from the OLT a Persistent Management Agent (PMA) in the optical network.

Example 4

The device according to Example 3, wherein the configuration information associated with the target backhaul model is obtained from the PMA, and the device is further caused to: transmit an indication of the target backhaul model to the PMA; receive from the PMA the configuration information configured by the PMA and associated with the target backhaul model; configure the target backhaul model based on the configuration information; and communicate with the PMA using the configured target backhaul model.

Example 5

The device according to Example 3, wherein the configuration information associated with the target backhaul model is obtained from the OLT, and the device is further caused to: receive, from the OLT, the configuration information configured by the OLT and associated with the target backhaul model; configure the target backhaul model based on the configuration information; and communicate with the OLT using the configured target backhaul model.

Example 6

The device according to Example 4, wherein transmitting the indication of the target backhaul model to the PMA comprises: transmitting a Remote Procedure Call (RPC) message to the PMA according to a Network Configuration (NETCONF) protocol, to initiate a call home connection to the PMA; and transmitting the indication of the target backhaul model to the PMA using the call home connection.

Example 7

The device according to Example 1, wherein the message indicates that the target backhaul model is to be started in the device.

Example 8

The device according to Example 1, wherein the message indicates that a current backhaul model of the device is to be switched to the target backhaul model.

Example 9

The device according to Example 8, wherein the device is caused to communicate with the OLT using the target backhaul model by: storing configuration information associated with the current backhaul model; switching the current backhaul model to the target backhaul model; and communicating with the OLT using the target backhaul model.

Example 10

The device according to Example 9, wherein the device is caused to store the configuration information associated with the current backhaul model by: determining whether the message comprises a storage indication indicating that the configuration information associated with the current backhaul model is to stored; and in response to the message comprising the storage indication, storing the configuration information associated with the current backhaul model.

Example 11

The device according to Example 9, wherein the message comprises an optical network unit management control interface protocol management entity (OMCI ME), and wherein the storage indication is represented by one byte in the OMCI ME.

Example 12

The device according to any one of examples 1-11, wherein the message comprises an optical network unit management control interface protocol management entity (OMCI ME), and wherein the identification of the target backhaul model is represented by one byte in the OMCI ME.

Example 13

The device according to any one of examples 1-11, wherein the target backhaul model is selected by the OLT from a plurality of backhaul models, the plurality of backhaul models comprise a first backhaul model and a second backhaul model, the first backhaul model is compatible with a TR-156 Passive Optical Network (PON) backhaul, and the second backhaul model is compatible with a TR-167 Passive Optical Network (PON) backhaul.

Example 14

The device according to any one of examples 1-11, wherein the optical network comprises at least one of the following: a Gigabit-Capable Passive Optical Network (GPON), a 10-Gigabit-Capable Passive Optical Network (XG-PON), a 10-Gigabit-Capable Symmetric Passive Optical Network (XGS-PON), and a Next-Generation Passive Optical Network (NG-PON).

Example 15

The device according to any one of examples 1-11, wherein the device comprises a Distribution Point Unit (DPU) of the optical network.

Example 16

A device for communication in an optical network, comprising: at least one processor; and at least one memory comprising computer program codes, the at least one memory and the computer program codes being configured, with the at least one processor, to cause the device to: select a target backhaul model from a plurality of backhaul models; and transmit, to a Distribution Point Unit (DPU) of the optical network, a message comprising an identification of the target backhaul model, such that the DPU communicates with the device using the target backhaul model.

Example 17

The device according to Example 16, wherein the device is further caused to: transmit, to the DPU, configuration information configured by the device and associated with the target backhaul model.

Example 18

The device according to Example 16, wherein the message indicates that the target backhaul model is to be started in the DPU.

Example 19

The device according to Example 16, wherein the message indicates that a current backhaul model of the DPU is to be switched to the target backhaul model.

Example 20

The device according to any one of examples 16-19, wherein the message further comprises a storage indication indicating that the configuration information associated with the current backhaul model is to be stored.

Example 21

The device according to example 16, wherein the message comprises an optical network unit management control interface protocol management entity (OMCI ME), and wherein the storage indication is represented by one byte in the OMCI ME.

Example 22

The device according to any one of examples 16-19, wherein the message comprises an optical network unit management control interface protocol management entity (OMCI ME), and wherein the identification of the target backhaul model is represented by one byte in the OMCI ME.

Example 23

The device according to any one of examples 16-19, wherein the plurality of backhaul models comprise a first backhaul model and a second backhaul model, the first backhaul model is compatible with a TR-156 Passive Optical Network (PON) backhaul, and the second backhaul model is compatible with a TR-167 Passive Optical Network (PON) backhaul.

Example 24

The device according to any one of examples 16-19, wherein the optical network comprises at least one of the following: a Gigabit-Capable Passive Optical Network (GPON), a 10-Gigabit-Capable Passive Optical Network (XG-PON), a 10-Gigabit-Capable Symmetric Passive Optical Network (XGS-PON), and a Next-Generation Passive Optical Network (NG-PON).

Example 25

A method implemented in an optical network, comprising: receiving, by a Distribution Point Unit (DPU) of an optical network, a message comprising an identification of a target backhaul model from an Optical Line Terminal (OLT) in the optical network; parsing the received message to obtain the identification of the target backhaul model; and communicating with the OLT using the target backhaul model.

Example 26

The method according to Example 25, further comprising: obtaining configuration information associated with the target backhaul model; configuring the target backhaul model based on the configuration information; and performing communication using the configured target backhaul model.

Example 27

The method according to Example 26, wherein the obtaining the configuration information associated with the target backhaul model comprises: obtaining the configuration information associated with the target backhaul model the OLT or a Persistent Management Agent (PMA) in the optical network.

Example 28

The method according to Example 27, wherein the configuration information associated with the target backhaul model is obtained from the PMA, and the method further comprises: transmitting an indication of the target backhaul model to the PMA; receiving, from the PMA, the configuration information configured by the PMA and associated with the target backhaul model; configuring the target backhaul model based on the configuration information; and communicating with the PMA using the configured target backhaul model.

Example 29

The method according to Example 27, wherein the configuration information associated with the target backhaul model is obtained from the OLT, and the method further comprises: receiving, from the OLT, the configuration information configured by the OLT and associated with the target backhaul model; configuring the target backhaul model based on the configuration information; and communicating with the OLT using the configured target backhaul model.

Example 30

The method according to Example 28, wherein transmitting the indication of the target backhaul model to the PMA comprises: transmitting a Remote Procedure Call (RPC) message to the PMA according to a Network Configuration (NETCONF) protocol, to initiate a call home connection to the PMA; and transmitting the indication of the target backhaul model to the PMA using the call home connection.

Example 31

The method according to Example 25, wherein the message indicates that the target backhaul model is to be started in the DPU.

Example 32

The method according to Example 25, wherein the message indicates that a current backhaul model of the DPU is to be switched to the target backhaul model.

Example 33

The method according to Example 32, wherein the communicating with the OLT using the target backhaul model comprises: storing configuration information associated with the current backhaul model; switching the current backhaul model to the target backhaul model; and communicating with the OLT using the target backhaul model.

Example 34

The method according to Example 33, wherein storing the configuration information associated with the current backhaul model comprises: determining whether the message comprises a storage indication indicating that the configuration information associated with the current backhaul model is to be stored; and in response to the message comprising the storage indication, storing the configuration information associated with the current backhaul model.

Example 35

The method according to Example 34, wherein the message comprises an optical network unit management control interface protocol management entity (OMCI ME), and wherein the storage indication is represented by one byte in the OMCI ME.

Example 36

The method according to any one of examples 25-35, wherein the message comprises an optical network unit management control interface protocol management entity (OMCI ME), and wherein the identification of the target backhaul model is represented by one byte in the OMCI ME.

Example 37

The method according to any one of examples 25-35, wherein the target backhaul model is selected by the OLT from a plurality of backhaul models, the plurality of backhaul models comprise a first backhaul model and a second backhaul model, the first backhaul model is compatible with a TR-156 Passive Optical Network (PON) backhaul, and the second backhaul model is compatible with a TR-167 Passive Optical Network (PON) backhaul.

Example 38

The method according to any one of examples 25-35, wherein the optical network comprises at least one of the following: a Gigabit-Capable Passive Optical Network (GPON), a 10-Gigabit-Capable Passive Optical Network (XG-PON), a 10-Gigabit-Capable Symmetric Passive Optical Network (XGS-PON), and a Next-Generation Passive Optical Network (NG-PON).

Example 39

A method implemented in an optical network, comprising: selecting, by an Optical Line Terminal (OLT) in the optical network, a target backhaul model from a plurality of backhaul models; and transmitting, to a Distribution Point Unit (DPU) of the optical network, a message comprising an identification of the target backhaul model, such that the DPU communicates with the OLT using the target backhaul model.

Example 40

The method according to Example 39, further comprising: transmitting, to the DPU, configuration information configured by the OLT and associated with the target backhaul model.

Example 41

The method according to Example 39, wherein the message indicates that the target backhaul model is to be started in the DPU.

Example 42

The method according to Example 39, wherein the message indicates that the current backhaul model of the DPU is to be switched to the target backhaul model.

Example 43

The method according to any one of examples 39-42, wherein the message further comprises a storage indication indicating that the configuration information associated with the current backhaul model is to be stored.

Example 44

The method according to example 39, wherein the message comprises an optical network unit management control interface protocol management entity (OMCI ME), and wherein the storage indication is represented by one byte in the OMCI ME.

Example 45

The method according to any one of examples 39-42, wherein the message comprises an optical network unit management control interface protocol management entity (OMCI ME), and wherein the identification of the target backhaul model is represented by one byte in the OMCI ME.

Example 46

The method according to any one of examples 39-42, wherein the plurality of backhaul models comprise a first backhaul model and a second backhaul model, the first backhaul model is compatible with a TR-156 Passive Optical Network (PON) backhaul, and the second backhaul model is compatible with a TR-167 Passive Optical Network (PON) backhaul.

Example 47

The method according to any one of examples 39-42, wherein the optical network comprises at least one of the following: a Gigabit-Capable Passive Optical Network (GPON), a 10-Gigabit-Capable Passive Optical Network (XG-PON), a 10-Gigabit-Capable Symmetric Passive Optical Network (XGS-PON), and a Next-Generation Passive Optical Network (NG-PON).

Example 48

An apparatus implemented in an optical network, comprising: means for receiving a message comprising an identification of a target backhaul model from an Optical Line Terminal (OLT) in the optical network; means for parsing the received message to obtain the identification of the target backhaul model; and means for communicating with the OLT using the target backhaul model.

Example 49

The apparatus according to Example 48, further comprising: means for obtaining configuration information associated with the target backhaul model; means for configuring the target backhaul model based on the configuration information; and means for performing communication using the configured target backhaul model.

Example 50

The apparatus according to Example 49, wherein the means for obtaining the configuration information associated with the target backhaul model is configured to obtain the configuration information associated with the target backhaul model from the OLT or a Persistent Management Agent (PMA) in the optical network.

Example 51

The apparatus according to Example 50, wherein the configuration information associated with the target backhaul model is obtained from the PMA, the apparatus further comprises: means for transmitting an indication of the target backhaul model to the PMA; means for receiving, from the PMA, the configuration information configured by the PMA and associated with the target backhaul model; means for configuring the target backhaul model based on the configuration information; and means for communicating with the PMA using the configured target backhaul model.

Example 52

The apparatus according to Example 50, wherein the configuration information associated with the target backhaul model is obtained from the OLT, and the apparatus further comprises: means for receiving, from the OLT, the configuration information configured by the OLT and associated with the target backhaul model; means for configuring the target backhaul model based on the configuration information; and means for communicating with the OLT using the configured target backhaul model.

Example 53

The apparatus according to Example 51, wherein the means for transmitting the indication of the target backhaul model to the PMA is configured to: transmit a Remote Procedure Call (RPC) message to the PMA according to a Network Configuration (NETCONF) protocol, to initiate a call home connection to the PMA; and means for transmitting the indication of the target backhaul model to the PMA using the call home connection.

Example 54

The apparatus according to Example 48, wherein the message indicates that the target backhaul model is to be started in the DPU.

Example 55

The apparatus according to Example 48, wherein the message indicates that the current backhaul model of the apparatus is to be switched to the target backhaul model.

Example 56

The apparatus according to Example 55, wherein the means for communicating with the OLT using the target backhaul model comprises: means for storing configuration information associated with the current backhaul model; means for switching the current backhaul model to the target backhaul model; and means for communicating with the OLT using the target backhaul model.

Example 57

The apparatus according to Example 56, wherein the means for storing the configuration information associated with the current backhaul model is configured to: determine whether the message comprises a storage indication indicating that the configuration information associated with the current backhaul model is to be stored; and in response to the message comprising the storage indication, store the configuration information associated with the current backhaul model.

Example 58

The apparatus according to Example 57, wherein the message comprises an optical network unit management control interface protocol management entity (OMCI ME), and wherein the storage indication is represented by one byte in the OMCI ME.

Example 59

The apparatus according to any one of examples 48-58, wherein the message comprises an optical network unit management control interface protocol management entity (OMCI ME), and wherein the identification of the target backhaul model is represented by one byte in the OMCI ME.

Example 60

The apparatus according to any one of examples 48-58, wherein the target backhaul model is selected by the OLT from a plurality of backhaul models, the plurality of backhaul models comprise a first backhaul model and a second backhaul model, the first backhaul model is compatible with a TR-156 Passive Optical Network (PON) backhaul, and the second backhaul model is compatible with a TR-167 Passive Optical Network (PON) backhaul.

Example 61

The apparatus according to any one of examples 48-58, wherein the optical network comprises at least one of the following: a Gigabit-Capable Passive Optical Network (GPON), a 10-Gigabit-Capable Passive Optical Network (XG-PON), a 10-Gigabit-Capable Symmetric Passive Optical Network (XGS-PON), and a Next-Generation Passive Optical Network (NG-PON).

Example 62

An apparatus for communication in an optical network, comprising: means for selecting a target backhaul model from a plurality of backhaul models; and means for transmitting, to a Distribution Point Unit (DPU) of the optical network, a message comprising an identification of the target backhaul model, such that the DPU communicates with an Optical Line Terminal (OLT) in the optical network using the target backhaul model.

Example 63

The apparatus according to Example 62, further comprising: means for transmitting, to the DPU, configuration information configured by the OLT and associated with the target backhaul model.

Example 64

The apparatus according to Example 62, wherein the message indicates that the target backhaul model is to be started in the DPU.

Example 65

The apparatus according to Example 62, wherein the message indicates that a current backhaul model of the DPU is to be switched to the target backhaul model.

Example 66

The apparatus according to any one of examples 62-65, wherein the message further comprises a storage indication indicating that the configuration information associated with the current backhaul model is to be stored.

Example 67

The apparatus according to example 62, wherein the message comprises an optical network unit management control interface protocol management entity (OMCI ME), and wherein the storage indication is represented by one byte in the OMCI ME.

Example 68

The apparatus according to any one of examples 62-65, wherein the message comprises an optical network unit management control interface protocol management entity (OMCI ME), and wherein the identification of the target backhaul model is represented by one byte in the OMCI ME.

Example 69

The apparatus according to any one of examples 62-65, wherein the plurality of backhaul models comprise a first backhaul model and a second backhaul model, the first backhaul model is compatible with a TR-156 Passive Optical Network (PON) backhaul, and the second backhaul model is compatible with a TR-167 Passive Optical Network (PON) backhaul.

Example 70

The apparatus according to any one of examples 62-65, wherein the optical network comprises at least one of the following: a Gigabit-Capable Passive Optical Network (GPON), a 10-Gigabit-Capable Passive Optical Network (XG-PON), a 10-Gigabit-Capable Symmetric Passive Optical Network (XGS-PON), and a Next-Generation Passive Optical Network (NG-PON).

Example 71

A computer-readable storage medium with a computer program stored thereon, the computer program comprising instructions which, when executed by a processor on a device, causing the device to execute the method according to any one of examples 25 to 38.

Example 72

A computer-readable storage medium with a computer program stored thereon, the computer program comprising instructions which, when executed by a processor on a device, causing the device to execute the method according to any one of examples 39 to 47.

We claim:
1. An apparatus, comprising:
at least one processor; and
at least one memory comprising computer program code,
the at least one memory and the computer program code being configured, with the at least one processor, to cause the apparatus to:
receive a message comprising an identification of a target backhaul model from an optical line terminal (OLT) in an optical network, wherein the message indicates that the target backhaul model is to be started in the apparatus;

parse the received message to obtain the identification of the target backhaul model; and communicate with the OLT using the target backhaul model, the at least one memory and the computer program code being further configured, with the at least one processor, to cause the apparatus to:

obtain configuration information associated with the target backhaul model;

configure the target backhaul model based on the configuration information; and perform communication using the configured target backhaul model, wherein the apparatus, when obtaining the configuration information associated with the target backhaul model, is further caused to:

transmit an indication of the target backhaul model to a persistent management agent (PMA) in the optical network;

receive, from the PMA, the configuration information configured by the PMA and associated with the target backhaul model;

configure the target backhaul model based on the configuration information; and communicate with the PMA using the configured target backhaul model.

2. The apparatus according to claim 1, wherein the apparatus, when obtaining the configuration information associated with the target backhaul model, is further caused to:

receive, from the OLT, the configuration information configured by the OLT and associated with the target backhaul model;

configure the target backhaul model based on the configuration information; and communicate with the OLT using the configured target backhaul model.

3. The apparatus according to claim 1, wherein transmitting the indication of the target backhaul model to the PMA comprises:

transmitting a remote procedure call (RPC) message to the PMA according to a Network Configuration (NETCONF) protocol, to initiate a call home connection to the PMA; and transmitting the indication of the target backhaul model to the PMA using the call home connection.

4. The apparatus according to claim 1, wherein the apparatus is caused to communicate with the OLT using the target backhaul model by:

storing configuration information associated with the current backhaul model;

switching the current backhaul model to the target backhaul model; and communicating with the OLT using the target backhaul model.

5. The apparatus according to claim 4, wherein the apparatus is caused to store the configuration information associated with the current backhaul model by:

determining whether the message comprises a storage indication indicating that the configuration information associated with the current backhaul model is to be stored; and in response to the message comprising the storage indication, storing the configuration information associated with the current backhaul model.

6. The apparatus according to claim 5, wherein the message comprises an optical network unit management control interface protocol management entity (OMCI ME), and wherein the storage indication is represented by one byte in the OMCI ME.

7. A method, comprising:

receiving, by a distribution point unit (DPU) of an optical network, a message comprising an identification of a target backhaul model from an optical line terminal (OLT) in the optical network, wherein the message indicates that the target backhaul model is to be started in the DPU;

parsing the received message to obtain the identification of the target backhaul model; and communicating with the OLT using the target backhaul model, the method further comprising:

obtaining configuration information associated with the target backhaul model;

configuring the target backhaul model based on the configuration information; and performing communication using the configured target backhaul model, wherein obtaining the configuration information associated with the target backhaul model further comprises:

transmitting an indication of the target backhaul model to a persistent management agent (PMA) in the optical network;

receiving, from the PMA, the configuration information configured by the PMA and associated with the target backhaul model;

configuring the target backhaul model based on the configuration information; and communicating with the PMA using the configured target backhaul model.

8. The method according to claim 7, wherein obtaining the configuration information associated with the target backhaul model further comprises:

receiving, from the OLT, the configuration information configured by the OLT and associated with the target backhaul model;

configuring the target backhaul model based on the configuration information; and communicating with the OLT using the configured target backhaul model.

9. The method according to claim 7, wherein the communicating with the OLT using the target backhaul model comprises:

storing configuration information associated with the current backhaul model;

switching the current backhaul model to the target backhaul model; and communicating with the OLT using the target backhaul model.

10. The method according to claim 9, wherein storing the configuration information associated with the current backhaul model comprises:

determining whether the message comprises a storage indication indicating that the configuration information associated with the current backhaul model is to be stored; and in response to the message comprising the storage indication, storing the configuration information associated with the current backhaul model.

11. The method according to claim 10, wherein the message comprises an optical network unit management control interface protocol management entity (OMCI ME), and wherein the storage indication is represented by one byte in the OMCI ME.

* * * * *